US011296622B2

(12) United States Patent
Huang et al.

(10) Patent No.: US 11,296,622 B2
(45) Date of Patent: Apr. 5, 2022

(54) ACTIVE BRAKE CIRCUIT FOR FAN WITH BACKUP POWER

(71) Applicant: ASIA VITAL COMPONENTS (SHEN ZHEN) CO., LTD., Shenzhen (CN)

(72) Inventors: Po-Sheng Huang, Shenzhen (CN); Wei-Tsai Huang, Shenzhen (CN); Chu-Hsien Chou, Shenzhen (CN)

(73) Assignee: ASIA VITAL COMPONENTS (SHEN ZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/909,972

(22) Filed: Jun. 23, 2020

(65) Prior Publication Data
US 2021/0399660 A1    Dec. 23, 2021

(51) Int. Cl.
*H02P 3/22* (2006.01)
*H02P 6/24* (2006.01)

(52) U.S. Cl.
CPC . *H02P 3/22* (2013.01); *H02P 6/24* (2013.01)

(58) Field of Classification Search
CPC .................................. H02P 3/22; H02P 6/24
USPC ................................................ 318/375, 362
See application file for complete search history.

(56) References Cited

U.S. PATENT DOCUMENTS

| 4,705,997 A | * | 11/1987 | Juzswik | H02M 1/38 318/443 |
| 7,423,852 B2 | | 9/2008 | Byers | |
| 7,446,433 B2 | | 11/2008 | Masciarelli et al. | |
| 9,013,123 B2 | * | 4/2015 | Innes | H02P 3/22 318/87 |
| 9,577,551 B2 | * | 2/2017 | Aiura | H02P 3/14 |
| 9,998,038 B1 | * | 6/2018 | Zhang | H02P 3/22 |

FOREIGN PATENT DOCUMENTS

| CN | 103199615 A | 7/2013 |
| CN | 106870426 A | 6/2017 |
| TW | M496896 U | 3/2015 |

\* cited by examiner

*Primary Examiner* — David Luo
(74) *Attorney, Agent, or Firm* — Demian K. Jackson; Jackson IPG PLLC

(57) ABSTRACT

The present invention relates to an active brake circuit for a fan with backup power, which comprises a protection circuit, a motor driving unit, a motor, a fan controller, and at least one bypass unit. The protection circuit receives an input power source. The motor driving unit connected between the protection circuit and the motor outputs a driving signal to the motor. The fan controller connected to the motor driving unit and the protection circuit outputs a control signal to the motor driving unit. The bypass unit is between the input power source and the motor driving unit such that the bypass unit passes the input power source to the motor driving unit. When the protection circuit disconnects the input power source to the motor, the motor driving unit outputs the driving signal to the motor such that a short circuit is formed to brake the motor.

8 Claims, 3 Drawing Sheets

ACTIVE BRAKE CIRCUIT FOR FAN WITH BACKUP POWER

BACKGROUND OF THE INVENTION

1. Field of the Invention

The present invention relates to a fan control field and in particular to an active brake circuit for a fan with backup power.

2. Description of Prior Art

The current fan braking mechanism mainly controls the electronic switch (MOSFET) of the fan driving unit through digital signals of a control switch unit or implements the equivalent switch using discrete resistors or discrete capacitors combined with switch components. By means of the two above-mentioned methods to control the switching of the electronic driving switch (MOSFET) located in front of the motor by turning on the electronic switch (MOSFET) of the upper-half bridge or the lower-half bridge, the coil of the motor is short-circuited to produce a braking effect.

Please refer to FIG. 1, which is a block diagram of a current fan braking circuit.

When the control switch unit fails or the electronic switch (MOSFET) of the fan driving unit fails due to short-circuiting, the frontmost circuit breaker will open for protection and shut down the power for the whole fan. At this moment, the active electronic braking function cannot operate without power supplied.

To overcome the above-mentioned problem, the electric power, which is generated by the back emf caused by the fan blades being blown by the return air, can be transmitted to the electronic brake for braking. However, such a braking mechanism is not sufficiently effective compared with the active electronic braking.

Therefore, how to solve the problems and disadvantages of the above prior art is the target which the industry and the inventor strive to reach.

SUMMARY OF THE INVENTION

Thus, to effectively overcome the above problems, it is one objective of the present invention to provide an active brake circuit for a fan with backup power through an additional independent circuit as the backup power.

It is another objective of the present invention to provide an active brake circuit for a fan with backup power, which can reduce the reverse current loss.

To achieve the above objectives, the present invention provides an active brake circuit for a fan with backup power, which comprises a protection circuit, a motor, a motor driving unit, a fan controller, and at least one bypass unit. The protection circuit receives an input power source. The motor driving unit is electrically connected between the protection circuit and the motor; the motor driving unit is used to output a driving signal to the motor. The fan controller is electrically connected to the motor driving unit and the protection circuit; the fan controller is used to output a control signal to the motor driving unit. The at least one bypass unit is electrically connected between the input power source and the motor driving unit such that the power of the input power source can be passed through the bypass unit to the motor driving unit. When the protection circuit disconnects the input power source transmitted to the motor, the motor driving unit outputs the driving signal to the motor according to the input power source transmitted through the bypass unit such that a short circuit associated with the motor is formed to brake the motor.

By means of the above-mentioned structure, in the normal operation, the power for the motor driving unit can be transmitted either through the protection circuit or through the bypass unit or through both; when the protection circuit is disconnected for any reason, the power can be transmitted to the fan controller through the bypass unit to achieve the effective braking.

DETAILED DESCRIPTION OF THE INVENTION

The above objectives, the structural and functional characteristics of the present invention will be described according to the preferred embodiments with the accompanying figures.

Figure 1:
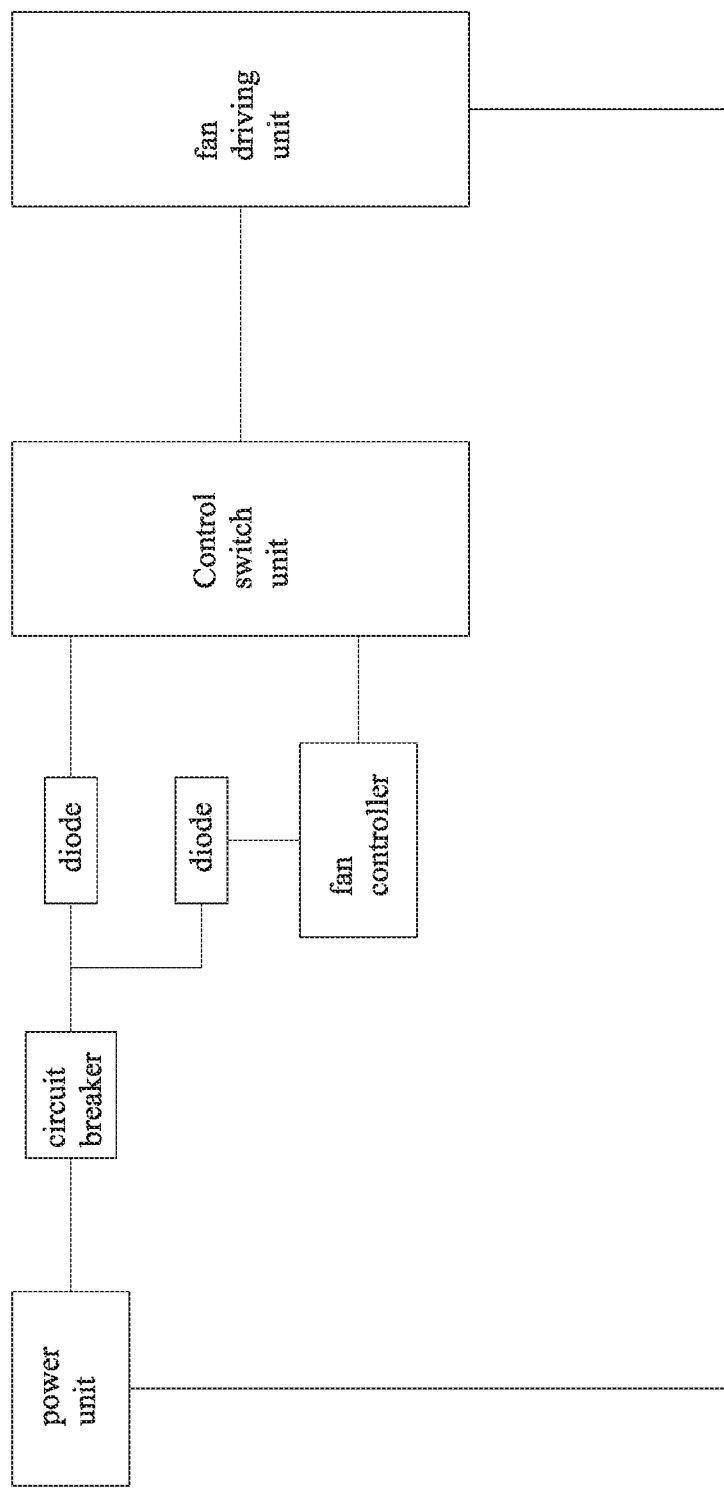
FIG. 1 is a block diagram of the current brake circuit for a fan.
Figure 2:
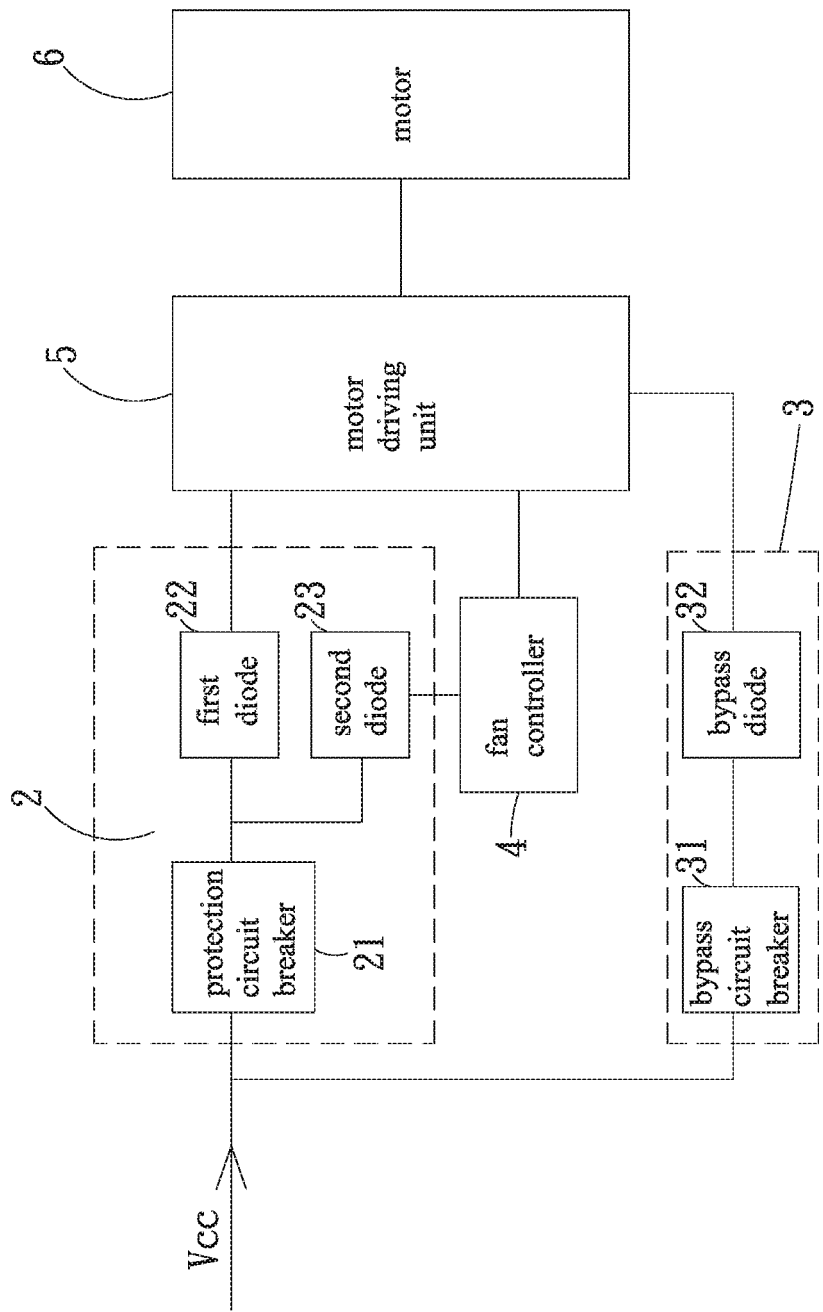
FIG. 2 is a block diagram of the active brake circuit for a fan with backup power of the present invention.
Figure 3:
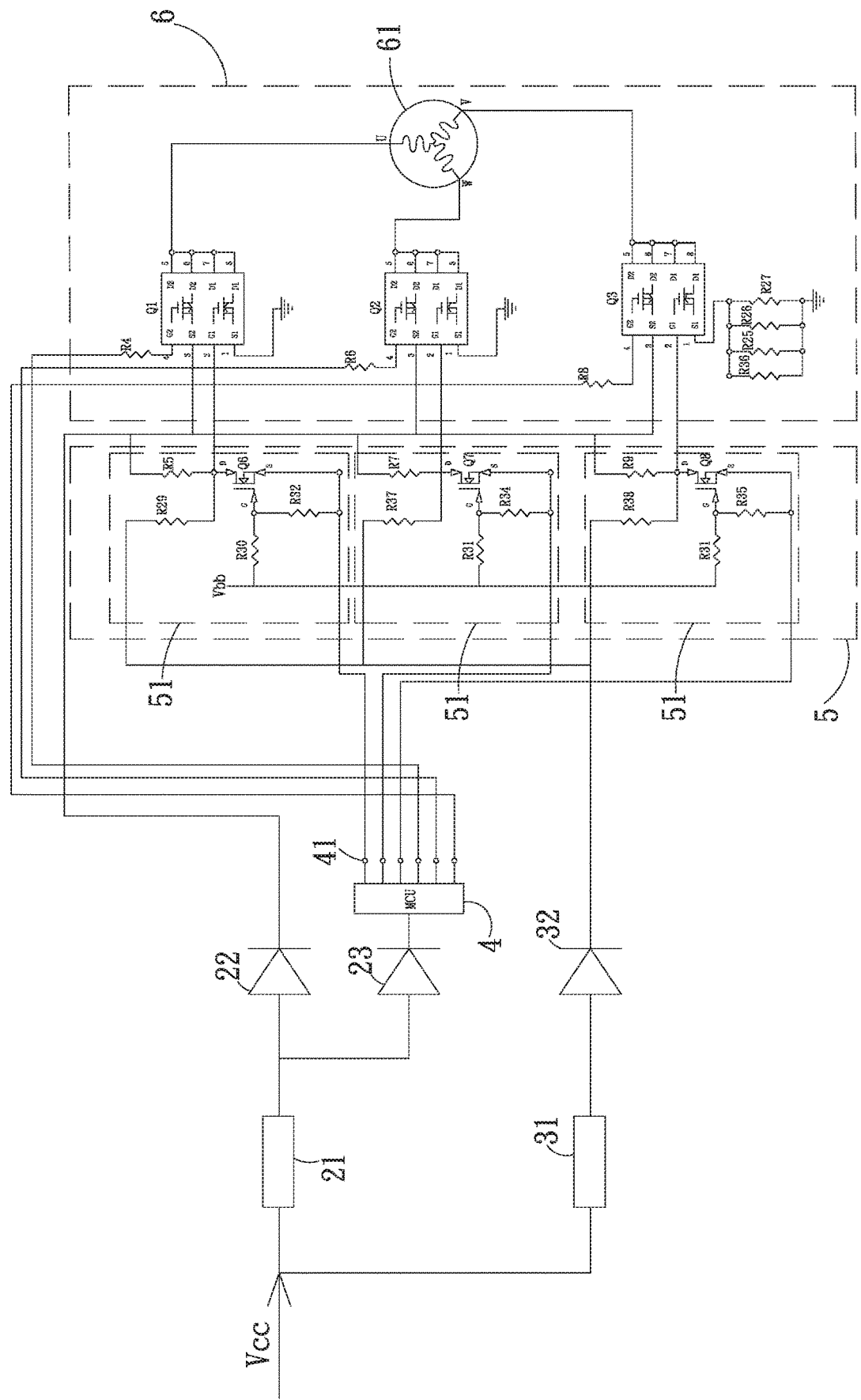
FIG. 3 is a circuit diagram of FIG. 2.

Please refer to FIGS. 2 and 3, which are the block diagram and the circuit diagram of the active brake circuit for a fan with backup power of the present invention, respectively. The active brake circuit for a fan with backup power of the present invention comprises a protection circuit 2, a motor 6, a motor driving unit 5, a fan controller 4, and at least one bypass unit 3. The protection circuit 2 receives an input power source Vcc (e.g., 12 volt). In the current embodiment, the input power source Vcc is provided by a power supply. The protection circuit 2 comprises a protection circuit breaker 21, a first diode 22, and a second diode 23. In the current embodiment, a fuse is used as the protection circuit breaker for explanation and will blow by the overcurrent for protection. One end of the protection circuit breaker 21 is connected to the input power source Vcc; the other end of the protection circuit breaker 21 is electrically connected to one end of the first diode 22 and one end of the second diode 23. The other end of the first diode 22 is electrically connected to the motor driving unit 5. The fan controller 4 is electrically connected to the other end of the second diode 23 and to the motor driving unit 5.

The first diode 22 has an anode and a cathode. The other end of the protection circuit breaker 21 is electrically connected to the anode of the first diode 22; the cathode of the first diode 22 is electrically connected to the motor driving unit 5. The second diode 23 has an anode and a cathode. The anode of the second diode 23 and the anode of the first diode 22 are electrically connected to the other end of the protection circuit breaker 21. The cathode of the second diode 23 is electrically connected to the fan controller 4. The motor 6 is electrically connected to the motor driving unit 5. In the current embodiment, a three-phase motor is used as the motor 6 for explanation, but not limited to this. In practice, the motor 6 can be the single-phase motor with proper modifications of the number of the motors 6 and the circuit and the motor driving unit 5. The motor 6 has plural bridge transistors Q1, Q2, Q3 and a coil 61. The bridge transistors Q1, Q2, Q3 are connected to the motor driving unit 5 and the coil 61. Each of the bridge transistors Q1, Q2, Q3 comprises a PMOS transistor and an NMOS transistor, which are used as the switches to drive the motor 6. In the current embodiment, the upper bridge switch is an NMOS transistor and the lower bridge switch is a PMOS transistor, but not limited to this.

The motor driving unit 5 is electrically connected between the protection circuit 2 and the motor 6. The motor driving unit 5 outputs a driving signal to the motor 6 to drive the motor 6 according to the fan controller 4. In the current embodiment, the motor driving unit 5 has three motor drivers 51 which are electrically connected to plural bridge transistors Q1, Q2, Q3 correspondingly. Each motor driver 51 is composed of a transistor and several resistors. The fan controller 4 is a micro processing unit (MCU) in the current embodiment. The fan controller 4 is electrically connected to the motor driving unit 5 and the protection circuit 2. The fan controller 4 has plural output pins 41 which are electrically connected to the input ends of the three motor drivers 51 to output the control signals like the PWM signals to the motor driving unit 5. The power input pin of the fan controller 4 is electrically connected to the cathode of the second diode 23. In a feasible embodiment, the fan controller 4 can be a central processing unit (CPU) or a digital signal processor (DSP).

The at least one bypass unit 3 is electrically connected between the input power source Vcc and the motor driving unit 5 such that the power of the input power source Vcc can be passed through the bypass unit 3 to the motor driving unit 5. Therefore, the bypass unit 3 can be used as the backup power for the motor driving unit 5 to drive the bridge transistors Q1, Q2, Q3 which turn on the upper-half bride or the lower-half bridge. The bypass unit 3 comprises a bypass circuit breaker 31 and a bypass diode 32. The bypass circuit breaker 31 is tripped and opened by the overloading or the overcurrent for protection. The bypass circuit breaker 31 is electrically connected to the input power source Vcc. The anode of the bypass diode 32 is electrically connected to the bypass circuit breaker 31 and the cathode of the bypass diode 32 is electrically connected to the motor driving unit 5.

In the current embodiment, the protection circuit breaker 21 and the bypass circuit breaker 31 are not limited to be the above-mentioned fuses and any equivalent device which can prevent the overcurrent or the overloading can be used as the circuit breaker described in the present invention. For example, the protection circuit breaker 21 and the bypass circuit breaker 31 can be air circuit breakers; the first diode 22, the second diode 23, and the bypass diode 32 can be used in the rectifying diode circuit. In alternative embodiment, the at least one bypass unit 3 can be plural bypass unit 3 electrically connected between the input power source Vcc and the motor driving unit 5.

When the motor 6 is in the normal operation, the input power source Vcc provides a large current required to actuate the motor driving unit 5 through the path of the protection circuit breaker 21 and the first diode 22 of the protection circuit 2. The path of the protection circuit breaker 21, the first diode 22, and the fan controller 4 is used by a small current to actuate the motor driving unit 5 to brake the motor 6 and control the motor speed.

When the motor 6 in an abnormal state, the abnormally large current trips or melts the protection circuit breaker 21 of the protection circuit 2 such that the protection circuit 2 is opened to disconnect the power to the motor 6. At this moment, the fan blades don't stop immediately and keeps rotating due to inertia. Meanwhile, the bypass unit 3 passes the power of the input power source Vcc to the motor driving unit 5 such that the pins G1 of the bridge transistors Q1, Q2, Q3 (i.e., the upper-half bridge NMOS switch) are at high voltage to turn on the bridge transistors Q1, Q2, Q3. As a result, the U-phase, V-phase, and W-phase of the motor 6 are grounded to form short circuits to achieve the braking effect.

That is to say, in a normal state, if the fan controller 4 is used to brake, the power of the input power source Vcc can be provided either through the protection circuit 2 or through the bypass unit 4 or through both such that the upper and lower bridge switches of the bridge transistors Q1, Q2, Q3 are both actuated to produce better braking effect. In an abnormal state, the power of the input power source Vcc is provided through the bypass unit 3 to turn on the upper bridge switch or the lower bridge switch of the bridge transistors Q1, Q2, Q3 for braking. Consequently, the braking of the fan is ensured to be correctly performed in any state.

In addition, the bypass unit 3 is only composed of fewer components, occupying little space, lower difficulty in manufacturing, and thus easy for implementation. Moreover, there is no large current passing and thus less failure condition with high reliability. Therefore, the braking function cannot fail and further the reverse current loss can be reduced.

In summary, the present invention has the following advantages:
1. The braking function can be ensured.
2. Fewer components make the implementation easier.
3. The reverse current loss is reduced.

The detailed description of the present invention is given above. The embodiments described above are only preferred ones of the present invention. All the equivalent modifications and variations using the methods, shapes, structures, and apparatus in the specification and figures of the present invention should be embraced by the claimed scope of the present invention.

What is claimed is:

1. An active brake circuit for a fan with backup power comprising:
   a protection circuit receiving an input power source;
   a motor electrically connected to the protection circuit;
   a motor driving unit electrically connected between the protection circuit and the motor, wherein the motor driving unit is used to output a driving signal to the motor;
   a fan controller electrically connected to the motor driving unit and the protection circuit, wherein the fan controller is used to output a control signal to the motor driving unit; and
   at least one bypass unit comprising a bypass circuit breaker and a bypass diode electrically connected between the input power source and the motor driving unit such that the power of the input power source can be passed through the bypass unit to the motor driving unit; wherein when the protection circuit disconnects the input power source transmitted to the motor, the motor driving unit outputs the driving signal to the motor according to the input power source transmitted through the bypass unit such that a short circuit associated with the motor is formed to brake the motor.

2. The active brake circuit for a fan with backup power according to claim 1, wherein the protection circuit comprises a protection circuit breaker, a first diode, and a second diode, wherein one end of the protection circuit breaker is connected to the input power source and the other end of the protection circuit breaker is electrically connected to one end of the first diode and to one end of the second diode, wherein the other end of the first diode is electrically connected to the motor driving unit, wherein the fan controller is electrically connected to the other end of the second diode and to the motor driving unit.

3. The active brake circuit for a fan with backup power according to claim 2, wherein the first diode has an anode and a cathode, wherein the other end of the protection circuit breaker is electrically connected to the anode of the first diode, wherein the cathode of the first diode is electrically connected to the motor driving unit.

4. The active brake circuit for a fan with backup power according to claim 2, wherein the second diode has an anode and a cathode, wherein the anode of the second diode and the anode of the first diode are electrically connected to the other end of the protection circuit breaker, wherein the cathode of the second diode is electrically connected to the fan controller.

5. The active brake circuit for a fan with backup power according to claim 2, wherein the protection circuit breaker is an air circuit breaker or a fuse.

6. The active brake circuit for a fan with backup power according to claim 2, wherein the fan controller is a micro processing unit, a central processing unit, or a digital signal processor.

7. The active brake circuit for a fan with backup power according to claim 1, wherein the bypass diode has an anode and a cathode, wherein the bypass circuit breaker is electrically connected to the input power source and the anode of the bypass diode, and wherein the cathode of the bypass diode is electrically connected to the motor driving unit.

8. The active brake circuit for a fan with backup power according to claim 7, wherein the bypass circuit breaker is an air circuit breaker or a fuse.

* * * * *